Patented Apr. 6, 1937

2,075,890

UNITED STATES PATENT OFFICE 2,075,890

MANUFACTURE OF ARTIFICIAL PRODUCTS BY DRY SPINNING PROCESSES

Henry Dreyfus, London, England

No Drawing. Original application April 15, 1930, Serial No. 444,621. Divided and this application February 8, 1934, Serial No. 710,348. In Great Britain May 17, 1929

12 Claims. (Cl. 18—54)

This application is divided from U. S. application S. No. 444,621 filed 15th April, 1930 and is a continuation in part of U. S. application S. No. 328,305 filed 24th December, 1928. The invention relates to the manufacture of artificial filaments, threads, ribbons, films or other products from solutions containing cellulose acetate or other cellulose esters or ethers by the evaporative or dry spinning method.

U. S. application S. No. 328,305 describes the production of improved filaments or threads or like products by the dry spinning of solutions containing cellulose esters or ethers in a solvent medium containing a volatile substance or substances, a non-solvent liquid or liquids of higher boiling point than the volatile substance or substances, and a solvent or solvents of higher boiling point than the non-solvent liquid or liquids, the higher boiling solvent or solvents being preferably employed in a total quantity not exceeding 30% of the weight of the cellulose ester or ether. By this means it is possible to obtain products of substantially increased extensibility or elasticity.

I have now found that very useful results are obtainable by employing a non-solvent liquid or liquids in such proportions that, taken together with the volatile substance or substances, it does not constitute a solvent for the cellulose derivative. The higher boiling solvent or solvents will then be employed at least in sufficient quantity to increase the solvent power of the whole medium to that requisite to dissolve the desired quantity of cellulose derivative.

U. S. application S. No. 328,305 gives the following examples of suitable volatile substances, non-solvent liquids and of higher boiling solvents and the same substances may be employed according to the present invention:—

*Volatile solvents.*—Acetaldehyde, formaldehyde, methyl formate, methyl acetate, ethyl formate, ethyl acetate (which, though not itself a solvent for cellulose acetate, can form solutions when used in conjunction with alcohols) or acetone or mixtures thereof.

*Non-solvent liquids.*—Water, benzene, xylene, propyl alcohol, ethyl alcohol, methyl alcohol or mixtures thereof.

*Higher boiling solvents.*—Diacetone-alcohol, acetyl carbinol, acetyl acetone, cyclopentanone, cyclobutanone or the ethers of olefine glycols and poly-olefine glycols for instance the monomethyl ether and mono- and di-ethyl ethers of ethylene glycol, the monomethyl and ethyl ethers of propylene glycol, the monoethyl ether of diethylene glycol etc., or mixtures of such solvents.

I have found that it is particularly advantageous to dilute with water or other non-solvent liquid, for example benzene, xylene, propyl alcohol, ethyl alcohol and the like, the spinning solutions used in the production of filaments, threads, etc. from cellulose esters or ethers. The use of water for this purpose is described and claimed in my British Patent No. 320,363. As indicated above, I now find that the proportion of water or other non-solvent liquid may be increased until the medium, volatile solvent plus higher boiling non-solvent, does not constitute a solvent for the desired quantity of cellulose derivative, but its solvent power is enhanced by the addition thereto of a suitable higher boiling solvent or solvents. Preferably higher boiling solvents are employed of very high solvent power for the cellulose derivative so that they may be employed in a relatively small proportion based on the cellulose derivative.

The lower limit in respect of the quantity of non-solvent in the spinning solution will depend of course upon the solubility characteristics of the cellulose acetate or other cellulose ester or ether employed and also on the particular solvent or solvents to be employed. In making up a suitable spinning solution in the case of cellulose acetate, for example, 70 parts of acetone to 30 parts of water may be employed, or 50 parts of acetone to 50 parts of water, or the content of water may be still further increased, and in some cases it is even possible to eliminate the acetone altogether. In all cases as indicated above the proportion of higher boiling solvent, e. g. diacetone alcohol, will be adjusted so that it is at least sufficient to confer solvent power for the required quantity of cellulose derivative upon the whole medium.

It will be seen therefore that the invention comprises broadly the use of a solvent medium which comprises (1) a non-solvent constituent or constituents which may or may not contain a volatile solvent or solvents, and (2) a solvent or solvents of higher boiling point than the non-solvent constituents.

As in U. S. application S. No. 328,305 the temperature and rate of flow of the air or other evaporative medium in the spinning solutions or chambers used for the production of filaments may be adjusted to obtain any desired type or form of filament (solid, hollow etc.) or cross-section of filament. The actual temperature of the spinning solution itself just prior to extrusion may be adjusted to obtain products of very high lustre, or as indicated in British Patent No. 334,195 or British Patent No. 334,198, lower temperatures may be employed to give products of any desired degree of lustre from very high lustre to matt or almost matt. The processes of U. S. Patent No. 1,938,646, U. S. Patent No. 1,957,508, British Patent No. 334,563 or French Patent No. 663,143 may also be applied to reduce the lustre of the products.

The following example is intended to illustrate the invention but not to limit it in any way:—

*Example*

A high viscosity cellulose acetate, such as is produced by the process of my U. S. Patent No. 1,708,787, is ripened as described in the example of my U. S. Patent No. 1,872,701 until it is soluble in aqueous acetone containing 20 to 25% of water but insoluble in aqueous acetone containing 30% of water. This cellulose acetate is then dissolved to form a 27% solution in a mixture of 70 parts of acetone, 30 parts of water and sufficient diacetone alcohol, say 8 to 15 parts, to confer solvent properties upon the medium. The solution is then spun in an apparatus of the type described in U. S. Patent No. 1,814,468, the spinning temperature being approximately 75 to 80° C.

What I claim and desire to secure by Letters Patent is:—

1. A spinning solution for the production of artificial materials by dry spinning processes comprising an organic derivative of cellulose dissolved in a medium which comprises a volatile solvent, a less volatile non-solvent and a still less volatile solvent, in which the proportions of volatile solvent to non-solvent are such that the mixture containing only these two substances in these proportions is a non-solvent and the amount of less volatile solvent is such as to confer solvent properties on the mixture.

2. A spinning solution for the production of artificial materials by dry spinning processes comprising acetone-soluble cellulose acetate dissolved in a medium which comprises acetone, a less volatile non-solvent and a still less volatile solvent, in which the proportions of acetone to non-solvent are such that the mixture containing only these two substances in these proportions is a non-solvent and the amount of less volatile solvent is such as to confer solvent properties on the mixture.

3. A spinning solution for the production of artificial materials by dry spinning processes comprising acetone-soluble cellulose acetate dissolved in a mixture of acetone, xylene and diacetone alcohol.

4. A spinning solution for the production of artificial materials by dry spinning processes comprising acetone-soluble cellulose acetate dissolved in a mixture of acetone, xylene and diacetone alcohol, the last being in a proportion of up to 30% of the weight of the cellulose acetate.

5. In a process for the manufacture of artificial filaments and the like by dry spinning processes, the step which comprises extruding into an evaporative atmosphere a solution containing a cellulose derivative dissolved in a medium comprising a volatile solvent, a less volatile non-solvent and a still less volatile solvent.

6. In a process for the manufacture of artificial filaments and the like by dry spinning processes, the step which comprises extruding into an evaporative atmosphere a solution containing an organic derivative of cellulose dissolved in a medium comprising a volatile solvent, a less volatile non-solvent and a still less volatile solvent, in which the proportions of volatile solvent to non-solvent are such that the mixture containing only these two substances in these proportions is a non-solvent and the amount of less volatile solvent is such as to confer solvent properties on the mixture.

7. In a process for the manufacture of artificial filaments and the like by dry spinning processes, the step which comprises extruding a solution containing an organic derivative of cellulose dissolved in a medium comprising a volatile solvent, a less volatile non-solvent and a still less volatile solvent, the last being in a proportion up to 30% of the weight of the cellulose derivative.

8. In a process for the manufacture of artificial filaments and other products by extruding a solution of cellulose acetate through a shaping device into a gaseous setting medium, the step which comprises effecting setting of the extruded products in an evaporative atmosphere containing the vapors of acetone, xylene and diacetone alcohol, the said vapors being produced by evaporation of said liquids contained in the said solution of cellulose acetate.

9. In a process for the manufacture of artificial filaments and the like by dry spinning processes, the step of extruding a solution of a cellulose derivative into an evaporative atmosphere containing the vapors of a solvent for the cellulose derivative, of a less volatile non-solvent therefor and of a still less volatile solvent therefor, said vapors being produced by evaporation of said solvents and non-solvent contained in the said solution of the cellulose derivative.

10. In the manufacture of artificial filaments and the like by dry spinning processes, the step of extruding a solution of an organic derivative of cellulose into an evaporative atmosphere containing the vapors of a solvent for the cellulose derivative of low boiling point, of a non-solvent for the cellulose derivative of higher boiling point and of a solvent for the cellulose derivative of still higher boiling point, said vapors being produced by evaporation of said solvents and non-solvent contained in the said solution of the cellulose derivative, the proportion of such solvent of low boiling point and of such non-solvent of higher boiling point in the spinning solution being such that the mixture of these two alone is a non-solvent for the cellulose derivative.

11. In the manufacture of artificial filaments and the like by dry spinning processes, the step of extruding a solution of an organic derivative of cellulose into an evaporative atmosphere containing the vapors of a solvent for the cellulose derivative of low boiling point, of a non-solvent for the cellulose derivative of higher boiling point and of a solvent for the cellulose derivative of still higher boiling point, said vapors being produced by evaporation of said solvents and non-solvent contained in the said solution of the cellulose derivative, said solvent of still higher boiling point being present in the spinning solution in a proportion of up to 30% on the weight of the cellulose derivative.

12. In the manufacture of artificial filaments by dry spinning processes, the step of extruding a solution of cellulose acetate into an evaporative atmosphere containing the vapors of acetone, of a non-solvent for the cellulose acetate of higher boiling point than acetone and of a solvent for the cellulose acetate of still higher boiling point, said vapors being produced by evaporation of said solvents and non-solvent contained in said solution of the cellulose acetate.

HENRY DREYFUS.